US007881226B2

(12) United States Patent
Chen et al.

(10) Patent No.: US 7,881,226 B2
(45) Date of Patent: Feb. 1, 2011

(54) MANAGING ARCHITECTURE AND DIAGNOSTIC METHOD FOR REMOTE CONFIGURATION OF HETEROGENEOUS LOCAL NETWORKS

(75) Inventors: Jiann-Liang Chen, Taipei (TW); Hsi-Feng Lu, Hualien (TW); Bing-Jie Huang, Yunlin (TW); Kuo-Chen Lien, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 354 days.

(21) Appl. No.: 11/930,126

(22) Filed: Oct. 31, 2007

(65) Prior Publication Data

US 2009/0034424 A1    Feb. 5, 2009

(30) Foreign Application Priority Data

Jul. 31, 2007    (TW) .............................. 96127993 A

(51) Int. Cl.
*H04L 12/28* (2006.01)
*H04L 12/26* (2006.01)
*G06F 15/16* (2006.01)
(52) U.S. Cl. .................. 370/254; 370/241; 709/217
(58) Field of Classification Search .................. 370/241, 370/245, 252, 255, 254, 392, 401, 466, 467
See application file for complete search history.

(56) References Cited

U.S. PATENT DOCUMENTS

| | | | | |
|---|---|---|---|---|
| 5,898,668 A * | 4/1999 | Shaffer | .................. | 370/230 |
| 6,026,150 A | 2/2000 | Frank et al. | .................. | 379/90.01 |
| 6,092,096 A * | 7/2000 | Lewis | .................. | 709/200 |
| 6,434,144 B1 * | 8/2002 | Romanov | .................. | 370/392 |
| 6,449,259 B1 * | 9/2002 | Allain et al. | .................. | 370/253 |
| 6,473,404 B1 * | 10/2002 | Kaplan et al. | .................. | 370/238 |
| 6,529,504 B1 * | 3/2003 | Sbisa | .................. | 370/385 |
| 6,782,429 B1 * | 8/2004 | Kisor | .................. | 709/241 |
| 6,826,512 B2 | 11/2004 | Dara-Abrams et al. | ...... | 702/183 |
| 6,924,727 B2 | 8/2005 | Nagaoka et al. | .................. | 340/3.1 |
| 7,051,116 B1 | 5/2006 | Rodriguez-Val et al. | .... | 709/245 |
| 7,069,345 B2 | 6/2006 | Shteyn | .................. | 709/250 |
| 7,376,147 B2 * | 5/2008 | Seto et al. | .................. | 370/465 |
| 7,385,938 B1 * | 6/2008 | Beckett et al. | .................. | 370/254 |
| 7,496,559 B2 * | 2/2009 | Gross et al. | .................. | 1/1 |
| 7,523,112 B2 * | 4/2009 | Hassan et al. | .................. | 1/1 |
| 2002/0087881 A1 * | 7/2002 | Harif | .................. | 713/201 |
| 2003/0091037 A1 * | 5/2003 | Latif et al. | .................. | 370/355 |

(Continued)

FOREIGN PATENT DOCUMENTS

EP    1562324    8/2005

(Continued)

*Primary Examiner*—Warner Wong

(57) ABSTRACT

Disclosed is a managing architecture and diagnostic method for remote configuration of heterogeneous local networks, which includes at least one sub-network agent, a local area network (LAN) management module and a remote LAN module. Each sub-network agent manages its sub-networks via its own management protocol, and collects the sub-networks' information. The LAN management module receives the requests from heterogeneous local networks via these sub-network agents, and converts the information associated with each request into a common information model (CIM) to seek a solution for each request. The remote LAN module receives the unsolved requests from the LAN management module via a channel, configures the heterogeneous local networks and uses compatible interface at a remote side to accomplish the management and diagnosis for the heterogeneous local networks.

26 Claims, 11 Drawing Sheets

U.S. PATENT DOCUMENTS

| | | | |
|---|---|---|---|
| 2006/0072463 A1* | 4/2006 | Manthoulis et al. | 370/241 |
| 2006/0253545 A1* | 11/2006 | Lakamp | 709/217 |
| 2007/0047466 A1* | 3/2007 | Todokoro | 370/254 |
| 2007/0076616 A1* | 4/2007 | Ngo et al. | 370/241 |
| 2007/0121527 A1* | 5/2007 | Zhou et al. | 370/254 |
| 2008/0232271 A1* | 9/2008 | Onishi | 370/254 |

FOREIGN PATENT DOCUMENTS

| | | |
|---|---|---|
| EP | 1585254 | 10/2005 |
| EP | 1667359 | 7/2006 |
| TW | 241509 | 6/2005 |
| TW | 257791 | 8/2005 |

* cited by examiner

_US 7,881,226 B2_

MANAGING ARCHITECTURE AND DIAGNOSTIC METHOD FOR REMOTE CONFIGURATION OF HETEROGENEOUS LOCAL NETWORKS

FIELD OF THE INVENTION

The present invention generally relates to a managing architecture and diagnostic method for remote configuration of heterogeneous local networks.

BACKGROUND OF THE INVENTION

As the communication and network technologies progress rapidly, the number of network-related facilities used in the home and small business is also increasing. The raising of the information appliances enables the popularity of easy-to-use, convenient, and Internet connectable appliances in the home and small business networks. In addition, the co-existence of different heterogeneous inter-connection technologies, such as IEEE 802.3, IEEE 802.11, Bluetooth, IEEE1394, power line, home plug, and so on, is becoming a common phenomenon.

In complicated and heterogeneous network environment, the management of the home and small business network is both a harsh challenge and an urgent demand for the users, appliance designers and service providers. In general, when the home or small business network encounter a problem, the user usually does not have sufficient knowledge or expertise to perform diagnosis or trouble-shooting. Therefore, this service provides a good business opportunity of potentially lucrative revenue for the telecommunication or Internet service companies.

As for the conventional network management protocols, the Simple Network Management Protocol (SNMP) is the most popular among the Internet Protocol Based (IP-BASED) local area network (LAN), while no obvious winner among other types of networks. However, SNMP is not a suitable protocol for remote home network diagnosis system because (1) the polling mechanism used by SNMP may cause network congestion in a large network or crossing the boundary of wide area network (WAN), and SNMP places the burden of data collection entirely on the management side, (2) SNMP agent cannot provide the historic record of an equipment or data, and (3) SNMP cannot use a unified data descriptor to preserve the flag, state and configuration of all the managed equipments.

U.S. Pat. No. 6,826,512 disclosed a method and apparatus for consumer electronic device diagnosis. The disclosed embodiments use the equipments in the home network, such as gateway and consumer electronic device, the test and diagnosis (T&D) process, such as collecting the error message and defining errors, and a remote equipment database for searching for related service correction routines to inform the user of the error and provide the solution.

Europe Patent EP1667359 disclosed a remote management method and related apparatus applicable to home network. The home network comprises a plurality of devices and a routing gateway. The routing gateway is coupled to each device of the plurality of devices. The remote management method comprises the step of using a Further Auto-Configuration Server (FACS) to request an Auto-Configuration Server (ACS) to access and configure the routing gateway in order to provide the FACS access to the routing gateway; and the ACS configuring the routing gateway in order to provide the FACS access to the routing gateway.

Taiwan Patent No. 1241509 disclosed an integrated network element management system and method, applicable to the placement of network elements in the network. The system includes a client computer and a master network element. The client computer includes a user interface for displaying the network topology, and a client application module for executing the network element placement. Each network element is represented by an icon in the network topology, and may be moved by dragging the icon. The master network element is connected to the client computer and at least a network element, and may communicate with one or more network elements through a topology discovery mechanism to obtain the network topology information. The master network element includes a topology information module for collecting and storing the network topology information and the configuration file of each network element. The disclosed patent defines the obtaining of the network element information, and establishing, storing and displaying the network topology.

SUMMARY OF THE INVENTION

In an exemplary embodiment, the present disclosure is directed to a managing architecture for remote configuration of heterogeneous local networks, comprising at least a sun-network agent, a local area network (LAN) management module, and a remote LAN module. Each sub-network agent manages the sub-network through its own management protocol, and collects sub-network information. The LAN management module is coupled to the sub-network agent and a cross-internet channel respectively, receives one or more requests from the heterogeneous local network through the sub-network agent, and converts the information accompanying the request into a common information model to find a solution for the request. The remote LAN module receives the requests, which the LAN management module fails to solve, through the channel, accesses and configures the heterogeneous local network remotely, and uses interface compatible with the heterogeneous local network to realize the management and diagnosis of the heterogeneous local network.

In another exemplary embodiment, the present disclosure is directed a managing architecture for remote configuration of heterogeneous local networks, comprising at least a sub-network agent, a remote LAN module, and a LAN management module. The LAN management module provides internet connection to the remote LAN module through a channel, and receives one or more management and network information of one or more heterogeneous local networks through the sub-network agent and converts into a common information model for providing the remote LAN module a unified management information and operation. When the heterogeneous local network encounters problems, the LAN management module searches for solution first, and when the LAN management module fails to provide solution, the LAN management module requests the remote LAN module or a remote manager for assistance so as to realize the management and diagnosis of the heterogeneous local network.

In another exemplary embodiment, the present disclosure is directed to a diagnosis method for remote configuration of heterogeneous local networks, comprising the steps of: detecting through at least a sub-network agent whether any sub-network connecting to the sub-network agent encounters any problem; when detecting at least a sub-network encountering problem, collecting the management and network information of the sub-network with the problem, and transmitting to a LAN management module; converting the management and network information of the sub-network with the problem into a common information model through the LAN management module, and performing diagnosis to determine whether a solution can be provided; when the LAN management module fails to provide a solution, requesting a remote LAN module or a remote management for assistance to realize the management and diagnosis of the sub-network with the problem; and responding the diagnosis message to a user interface or the sub-network agent.

In yet another exemplary embodiment, the present disclosure is directed to a method for updating network information for a management architecture for remote configuration of heterogeneous local network, comprising the steps of: determining whether network information is periodic information or dynamic information; if periodic, using the extract instruction to obtain the update information; if dynamic, collecting and processing the network information and converting the processed network information into a common information and obtaining the update information; filtering the updated periodic or dynamic information and determining whether to store remotely; if to store remotely, informing a remote LAN module and storing the updated information to a remote common information storage; and if not to store remotely, storing the updated information to a local common information storage.

In another exemplary embodiment, the present disclosure is directed to a method for adding a sub-network to a managing architecture for remote configuration of heterogeneous local networks, comprising the steps of detecting a new network through a network protocol conversion module; determining the attributes of the new network through a LAN management module; when the LAN management module fails to provide the support service to the new network, sending a request to a remote LAN module; the remote LAN module finding a suitable sub-network agent to the new network and transmitting to the LAN management module; and when the new network having a sub-network agent, performing the registration and announcement of the new network.

The foregoing and other features, aspects and advantages of the present disclosure will become better understood from a careful reading of a detailed description provided herein below with appropriate reference to the accompanying drawings.

DETAILED DESCRIPTION OF THE PREFERRED EMBODIMENTS

Figure 1A:
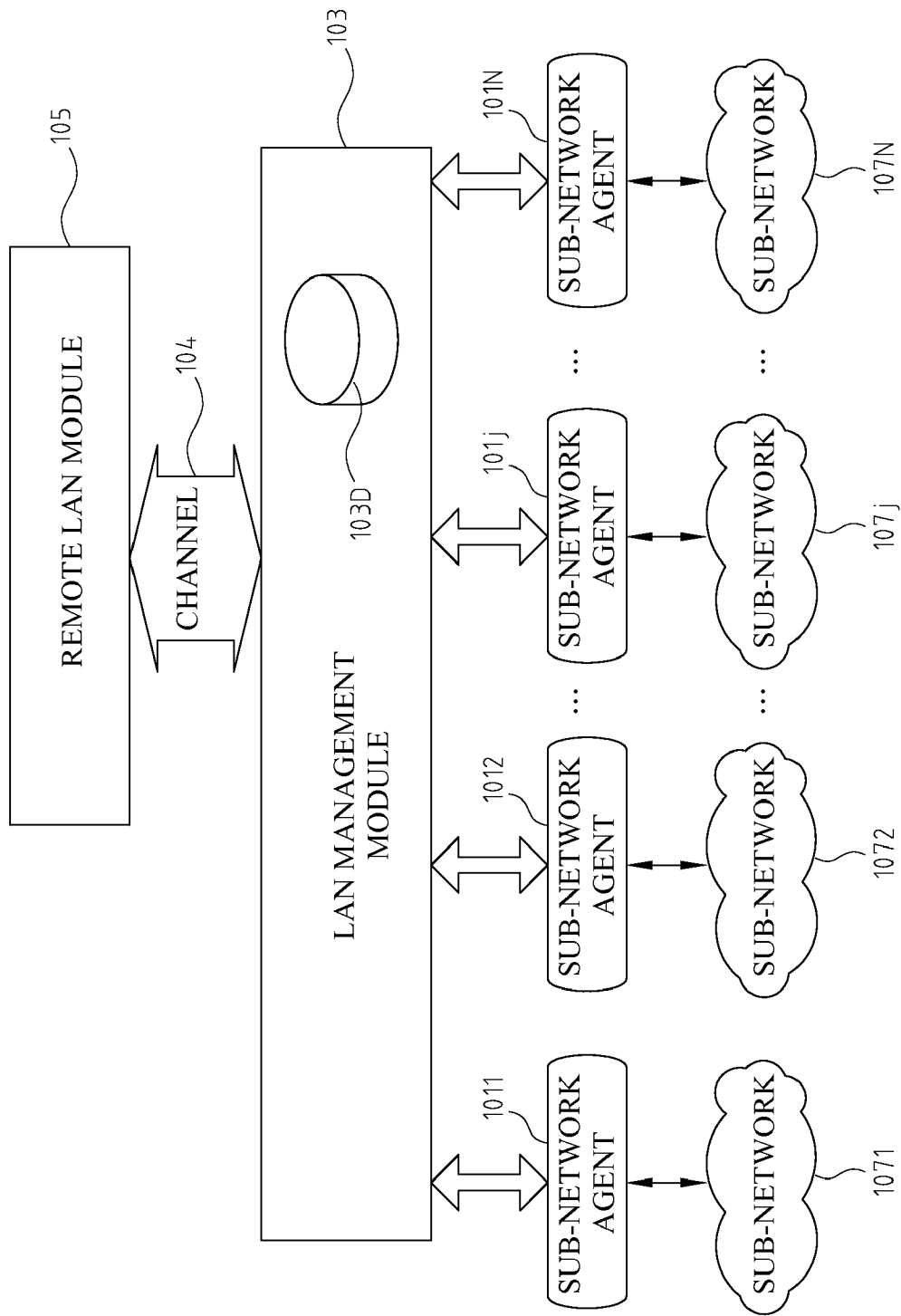
FIG. 1A shows a schematic view of an exemplary managing architecture for remote configuration of heterogeneous local networks, consistent with certain embodiments of the present invention.

FIG. 1A shows a schematic view of an exemplary managing architecture for remote configuration of heterogeneous local networks, consistent with certain embodiments of the present invention. Referring to FIG. 1A, managing architecture 100 comprises one or more sub-network agents 1011-101N, a LAN management module 103 and a remote LAN module 105. Each sub-network agent uses its own managing protocol to manage the connected sub-networks, and collects the information of the connected sub-networks. For example, sub-network 1071 is connected to sub-network agent 1011, sub-network 1072 is connected to sub-network agent 1012, sub-network 107N is connected to sub-network agent 101N, and so on.

LAN management module 103 is coupled respectively with sub-network agent 1011-101N and a channel 104 crossing internet boundary, receives one or more requests from heterogeneous local network, such as sub-network 107$j$, with 1<–$j$<=N through sub-network agents 1011-101N, converts the information accompanying the request into an accessible common information model, and seeks a solution for each request. The common information model may be stored in a media, such as common information storage media 103D.

Remote LAN module 105 receives the unsolved request from LAN management module 103 through channel 104, such as request from sub-network 107$j$, remotely access and configures the heterogeneous local network, such as 107$j$, and adopts an interface compatible to the heterogeneous local network to realize the management and the diagnosis of the heterogeneous local network.

Therefore, the managing architecture for remote configuration of heterogeneous local network may also be realized with another exemplary embodiment. LAN management module 103 provides internet connection to remote LAN module 105 through channel 104, receives management and network information of one or more heterogeneous local networks, and converts the information into a common information model to provide the unified management information and operation to remote LAN module 105. If one or more heterogeneous local networks encounter a problem, LAN management module 103 tries to find a solution first. When LAN management module 103 fails to find a solution, LAN management module 103 requests remote LAN module 105 or a remote manager for assistance to realize the management and the diagnosis of the one or more heterogeneous local networks.

Figure 1B:
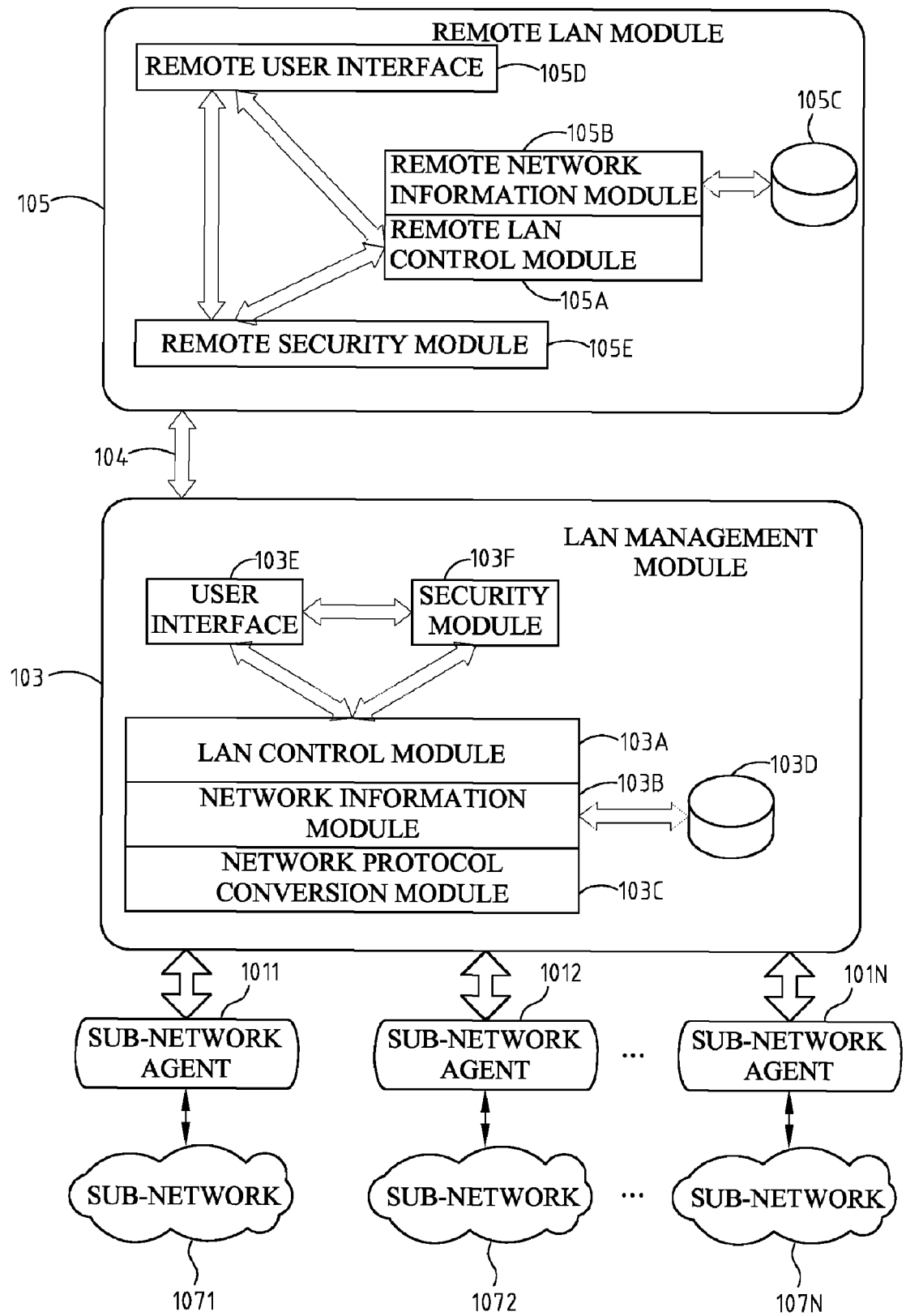
FIG. 1B shows a schematic view of an exemplary internal structure of the LAN management module and the remote LAN module, consistent with certain embodiments of the present invention.

FIG. 1B shows a schematic view of an exemplary internal structure of the LAN management module 103 and the remote LAN module 105, consistent with certain embodiments of the present invention. Referring to FIG. 1B, LAN management module 103 includes a LAN control module 103A, a network information module 103B, a network protocol conversion module 103C, a common information storage media 103D, a user interface 103E, and a security module 103F. Remote LAN module 105 includes a remote LAN control module 105A, a remote network information module 105B, a remote common information storage media 105C, a remote user interface 105D, and a remote security module 105E.

Network protocol conversion module 103C of LAN management module 103 receives the sub-network information of sub-network agents 1011-101N, converts the sub-network information into a common information model, and transmits to network information module 103B. Network information module 103B is responsible for accessing the common information model stored in common information storage media 103D. LAN control module 103A provides the management, diagnosis process, solution to the network problem, updates the network information, and is responsible for communicating with remote LAN control module 105A.

Remote LAN control module 105A receives the information of LAN control module 103A through channel 104. Remote network information module 105B accesses the LAN network information to remote common information storage media 105C, and monitors and manages LAN. Security module 103F and remote security module 105E are responsible respectively for the related security mechanism. User interface 103E and remote user interface 105D display the network information to the user.

The exemplary managing architecture of the embodiment allows the user to understand the heterogeneous network condition and possible causes of the problem. If the problem requires the user intervention to handle, the diagnosis process of the managing architecture may be used to communicate with the remote administrator for cooperative trouble-shooting. If the problem does not require the user intervention, the managing architecture may solve the problem and record the result to provide the remote administrator for reference or logging. The detailed operation and functions of the modules of the managing architecture are described as follows.

Sub-network agent 1011-101N may collect information of sub-network 1071-107N, and may warn about or respond to the related event automatically. The information provided by the sub-network agent may include the node information inside the sub-network, information between nodes, and other related network information. Each sub-network agent may use its own managing protocol, such as SNMP or common management information protocol (CMIP), to obtain the sub-network information. Each sub-network may build-in, customize or filter out the analysis of the event relevance. Each sub-network agent may also communicate with LAN management module 103 through protocol conversion module, and receive the instruction from LAN management module 103 to control related sub-networks. The information after sub-network agent 1011-101N filters or integrates may be returned to LAN management module 103 so that remote LAN module 105 knows the information and the status of each sub-network.

Network protocol conversion module 103C is responsible for communicating and coordinating with sub-network agent 1011-101N through related protocol and mechanism to obtain the basic and management information of sub-network 1071-107N. Network protocol conversion module 103C may issue a service, such as through registration, to notify other related services of the service content so that other related services may use the new service, such as through installation for executing instruction. Network protocol conversion module 103C may convert the obtained information into a common information model or similar format. The common information model may be an overall management information model describing all the computer systems and network equipments in an enterprise network environment, including a set of specifications and a set of schemas. Network protocol conversion module 103C may transmit the converted information to network information module 103B. The data conversion may be such as converting the sub-network instruction into common information model. The functions of network protocol conversion module 103C may be added flexibly.

Therefore, the communication between network protocol conversion module 103C and sub-network agent 1011-101N may include the downward obtaining of the basic or management information of the sub-networks, and the upward converting of the common information model into management protocol acceptable to the sub-network agents.

Network information module 103B analyzes and organizes the converted common information from network protocol conversion module 103C, and then selects and defines a common information model suitable for storing network information for storing in common information storage media 103D. Network information module 103B is responsible for accessing information stored in common information storage media 103D required by LAN control module 103A for diagnosis and management, and receives the issued diagnosis and managed instructions and passes the instructions to network protocol conversion module 103C for performing diagnosis and management. The common information model has sufficient expressive capability to represent all the managed objects, and has sufficient expansion capability to accommodate new managed objects as well as accessing the management information effectively. For example, the common information model object manager (CIMOM) of the management infrastructure of web-based enterprise management (WBEM) may play the role of network information module 103B.

Common information storage media 103D is the actual information storage media to match network information module 103B. Common information storage media 103D may be a database or a specific format file, such as management object format (MOF) file matching CIM in the management infrastructure of WBEM. The information stored in common information storage media 103D may be only accessed through network information module 103B.

LAN control module 103A is the control center of LAN management module 103, providing basic network management functions, network diagnosis process (as shown in FIG. 2), algorithm for solving network problems, network information update process (as shown in FIG. 3), and communicating with remote LAN control module 105A. The basic network management functions may include numerous items such as allowing the user to know through user interface 103E the network internal basic information, such as network topology, network traffic, network speed, and node information, or even the software installation on each node. In the problem diagnosis, as shown in FIG. 3, the collected information may be used to analyze the possible cause of the problem, and forwards the problem to LAN control module 103A. If LAN control module 103A fails to solve the problem internally, a request is sent to remote LAN module 105 for assistance to provide a solution.

When the problem is solved, LAN control module 103A or remote LAN control module 105A may report to the user or warn the user for preventing similar events in the future. When the problem is not completely solved, LAN control module 103A or remote LAN control module 105A will also inform the user of the problem handling status. For example, through the node analysis to obtain the node equipment information, LAN control module 103A or remote LAN control module 105A may use the information to search for equipment manufacturer for repairing and post the information on the user interface to inform the user. The cause or the solution to the problem may be recorded on common information storage media 103D or remote common information storage media 105C for future reference.

Remote LAN control module 105A, remote network information module 105B and remote common information storage media 105C of remote LAN module 105 basically operate in a way similar to those modules in LAN management module 103. The difference lies in remote LAN control module 105A is designed for remote LAN diagnosis and management service center. Therefore, remote control module 105A may monitor, manage, and register LAN, such as all home network and small business network. In general, remote LAN module 105 collects and utilizes global data, such as periodically obtaining the topology of each LAN. In performing LAN management and diagnosis, remote LAN control module 105A will request LAN control module 103A of a certain LAN management module for detailed information, and stores the information in remote information storage media 105C for assisting the solving of the problem that LAN control module 103A of LAN management module 103 fails to solve.

User interface 103E and remote user interface 105D show the network information, such as network topology, each node information, network traffic, and network speed. Through the graphic and web-based interface showing the network status, the user may easily use the mouse or button to process complicated network problem and issue management instructions with simple and clear guiding mode. For the user, the interface is simple and effective. Therefore, the user may understand the network internal basic information through the use of the user interface.

Security module 103F and remote security module 105E are responsible for related security mechanism, such as security authentication mechanism, data encryption mechanism, protecting the internal data access mechanism for LAN control module, and billing mechanism. Security authentication mechanism is to verify whether the user is the legitimate user or administrator so as to protect LAN control module 103A from invasion by illegitimate remote LAN control module 105A. During information transmission, a data encryption mechanism may be provided to prevent data from theft. The data encryption mechanism may be controlled by security module 103F and remote security module 105E, respectively. These two security modules may both encrypt and decrypt the data transmitted and received on either side. The encrypted data will not be easily theft or utilized so as to achieve the security objective.

The network information may be obtained through two different methods. The first is the periodic information, and the other is the dynamic information. Periodic information may be obtained by the extract instruction defined by LAN control module 103A through network information module 103B. The obtained in formation may be stored in common information storage media 103D.

The dynamic information may be obtained according to the demands of LAN diagnosis and management to configure the network equipment in the LAN through network information module 103B to request these equipments to report the related information when the defined event occurs.

Figure 2A:
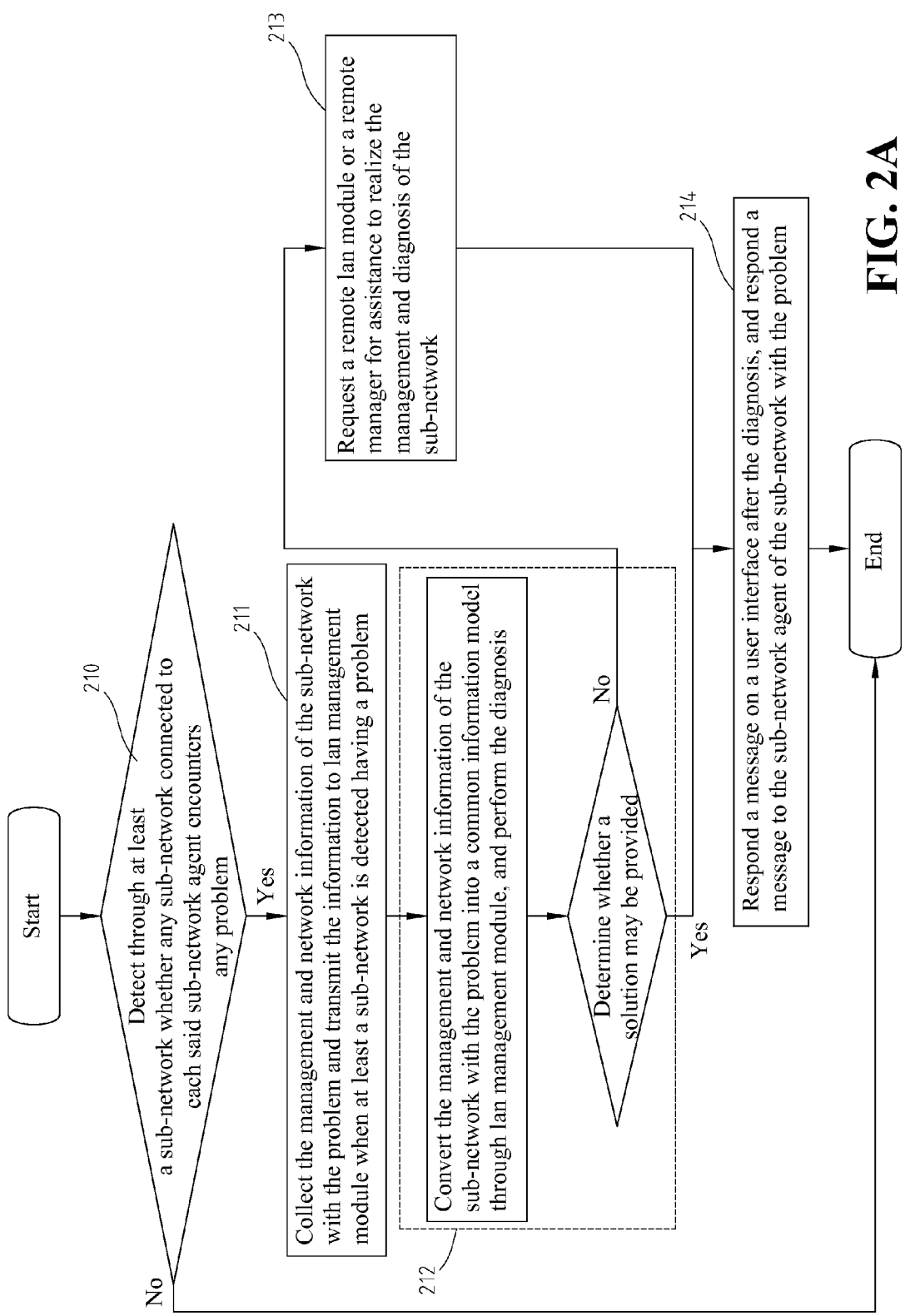
FIG. 2A shows an exemplary flowchart illustrating the diagnosis method for remote configuration of heterogeneous local networks, consistent with certain embodiments of the present invention.

FIG. 2A shows an exemplary flowchart illustrating the diagnosis method for remote configuration of heterogeneous local networks, consistent with certain embodiments of the present invention. Referring to FIG. 2A, step 210 is to detect through at least a sub-network whether any sub-network connected to each said sub-network agent encounters any problem. Step 211 is to collect the management and network information of the sub-network with the problem and transmit the information to LAN management module when at least a sub-network is detected having a problem. Through the LAN management module, the management and network information of the sub-network with the problem is converted into a common information model, and the diagnosis is performed to determine whether a solution may be provided, as shown in step 212. When the LAN management module fails to provide a solution, a request is sent to a remote LAN module or a remote manager for assistance to realize the management and diagnosis of the sub-network, as shown in step 213. Step 214 is to respond a message on a user interface after the diagnosis, and respond a message to the sub-network agent of the sub-network with the problem.

With the diagnosis process, the administrator may remotely perform trouble-shooting for heterogeneous local networks, and may effectively provide network condition and possible cause of the problem to the user. For example, when the problem is too complicated or requires the user to participate in trouble-shooting, the LAN management module may provide information and communicate with remote management to identify the problem and cooperate in finding a solution. When the solution is simple, the LAN management module may solve the problem and report the diagnosis message for record and for future reference.

Figure 2B:
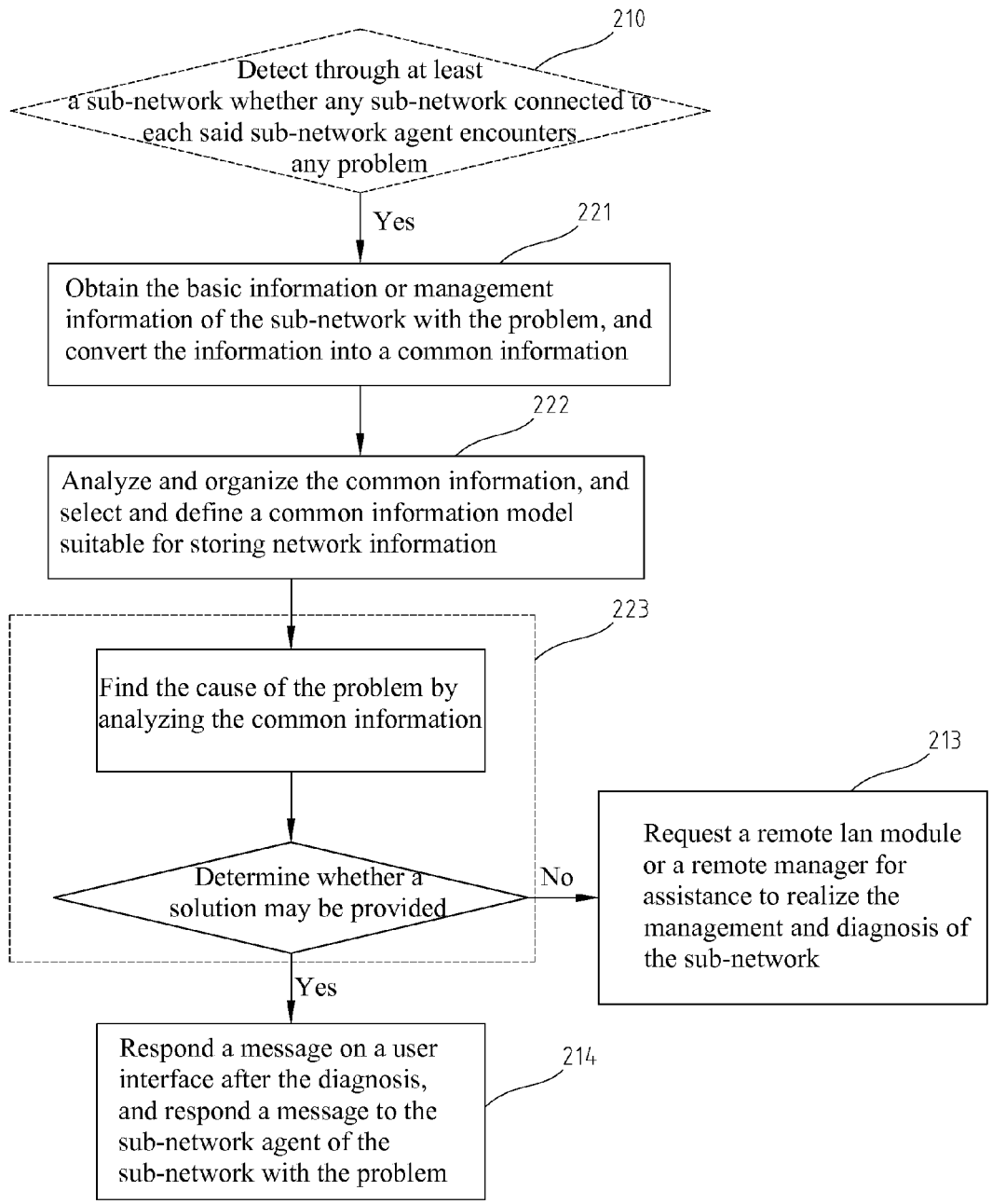
FIG. 2B shows an exemplary flowchart illustrating a process of LAN management module, consistent with certain embodiments of the present invention.

When detecting a sub-network encountering a problem, FIG. 2B shows an exemplary flowchart illustrating a process of LAN management module, consistent with certain embodiments of the present invention. Referring to FIG. 2B, step 221 is to obtain the basic information or management information of the sub-network with the problem, and converts the information into a common information. Step 222 is to analyze and organize the common information, and to select and define a common information model suitable for storing network information. Step 223 is to find the cause of the problem by analyzing the common information and determine whether a solution may be provided. When no solution may be provided, proceed to step 213; otherwise, proceed to step 214.

Figure 2C:
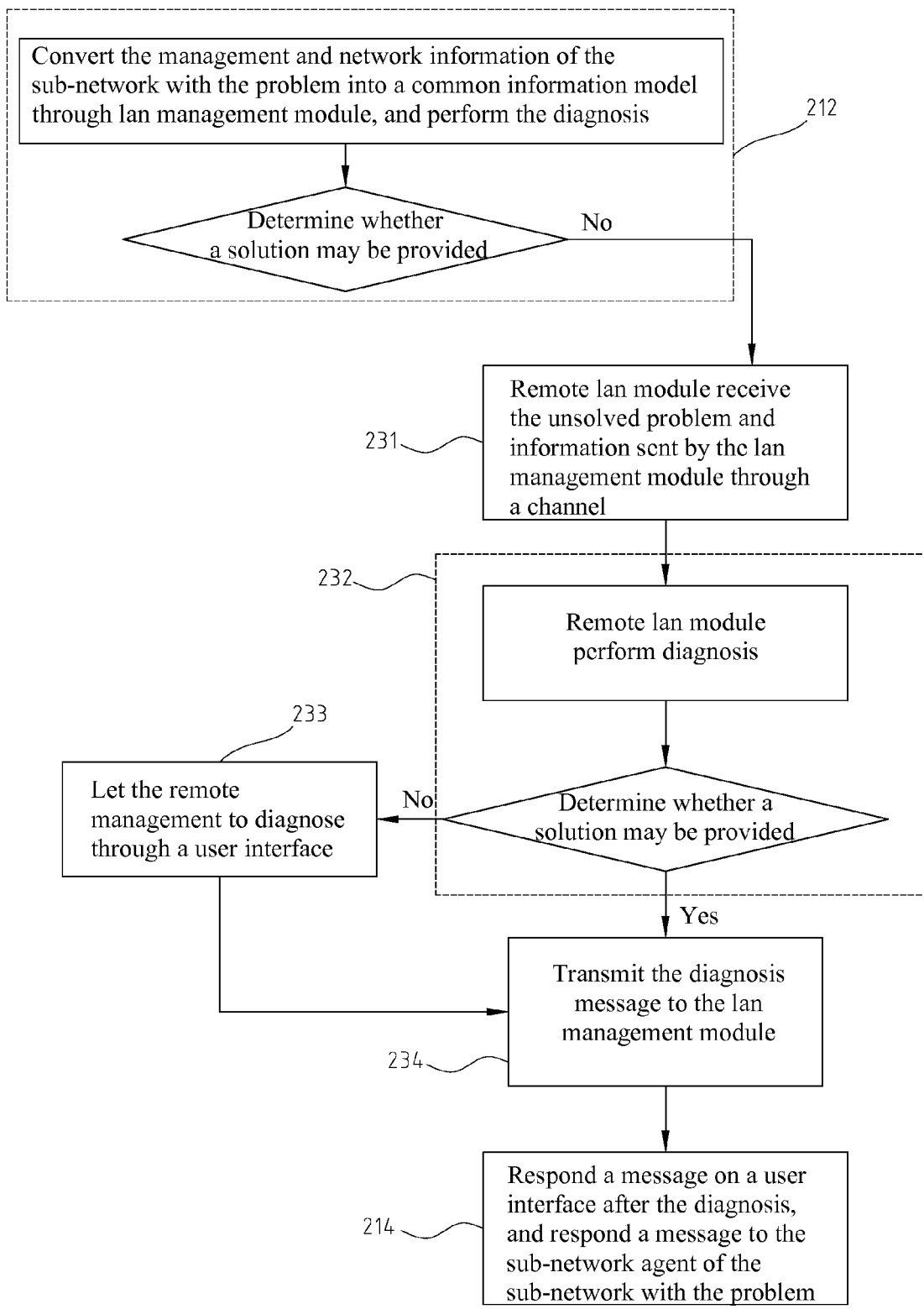
FIG. 2C shows an exemplary flowchart illustrating a process of remote LAN module, consistent with certain embodiments of the present invention.

FIG. 2C shows an exemplary flowchart illustrating a process of remote LAN module, consistent with certain embodiments of the present invention. Referring to FIG. 2C, step 231 is for the remote LAN module to receive the unsolved problem and information sent by the LAN management module through a channel. Step 232 is for the remote LAN module to diagnose to determine whether a solution may be provided. If not, proceed to step 233 to let the remote management to diagnose through a user interface, and then to step 234. Otherwise, proceed to step 234 directly. Step 234 is to transmit the diagnosis message to the LAN management module, and then proceed to step 214.

As aforementioned, when the problem is solved, the LAN management module or the remote LAN module may take further actions, such as notifying the user that the problem is solved or warn the user against future problems. The cause and the solution of the problem may be recorded, such as in common information storage media, for future reference.

After the diagnosis process, the dynamic information may provide algorithms for solving different network problems. When a problem occurs, the algorithms may be used directly. For example, when a new network is connected, or a network disappears from the connection, an algorithm may provide new routing path so that the message may be transmitted with the new routing path. When the message traffic is unbalanced, a load-balancing algorithm may be used to balance the traffic load. Other algorithms for improving efficiency may also be included.

Figure 3A:
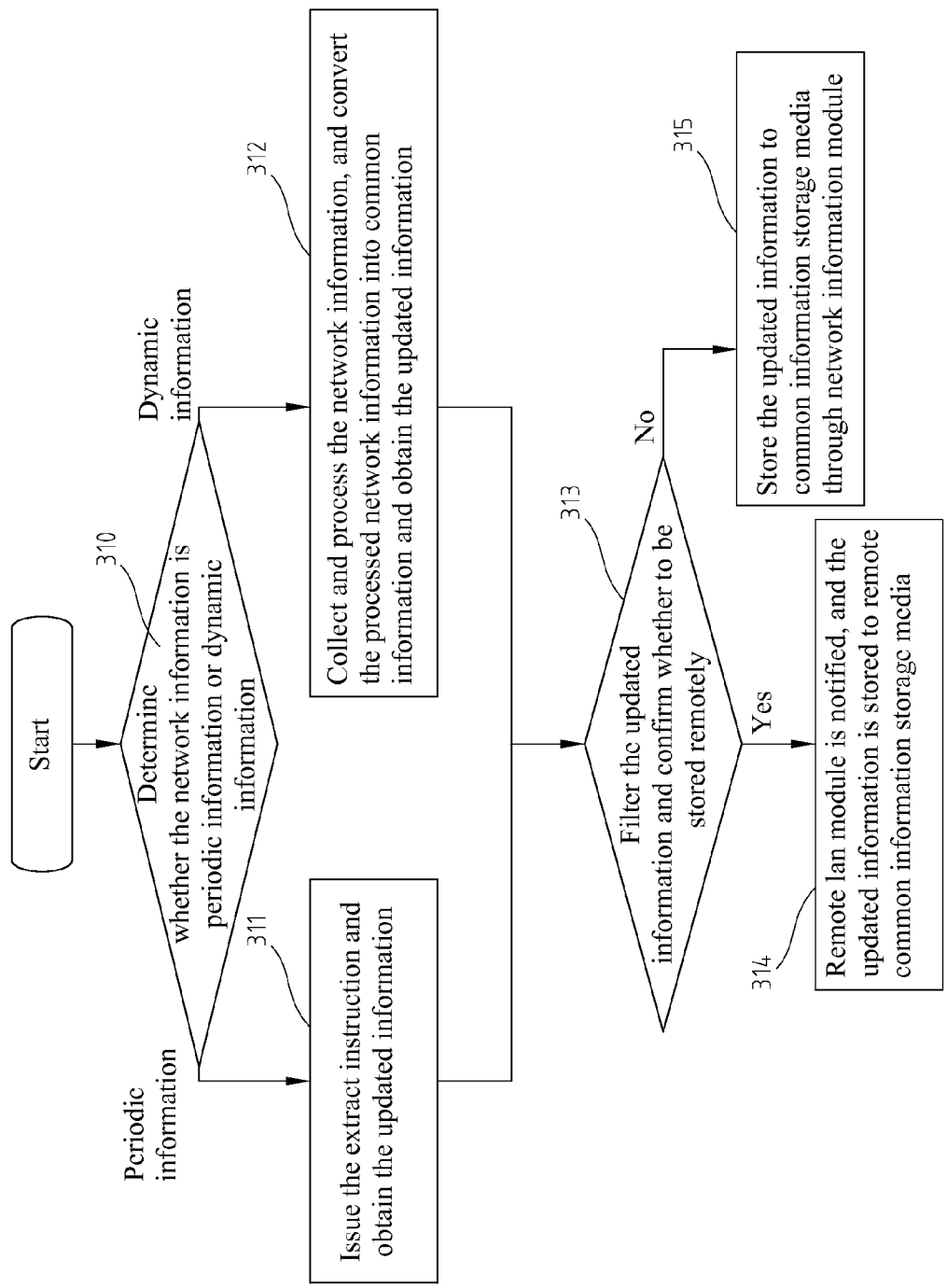
FIG. 3A shows an exemplary flowchart illustrating a network information update process, consistent with certain embodiments of the present invention.

FIG. 3A shows an exemplary flowchart illustrating a network information update process, consistent with certain embodiments of the present invention. Referring to FIG. 3A, step 310 is to determine whether the network information is periodic information or dynamic information. If periodic information, the LAN management module may issue the extract instruction and obtain the updated information, as shown in step 311. On the other hand, if dynamic information, step 312 is to collect and process the network information, and convert the processed network information into common information and obtain the update information.

After obtaining the update periodic or dynamic information, the updated information is filtered and confirmed whether to be stored remotely, as shown in step 313. If so, remote LAN module 105 is notified, and the update information is stored to remote common information storage media 105C, as shown in step 314. If not, the updated information is stored to common information storage media 103D through network information module 103B, as shown in step 315.

Figure 3B:
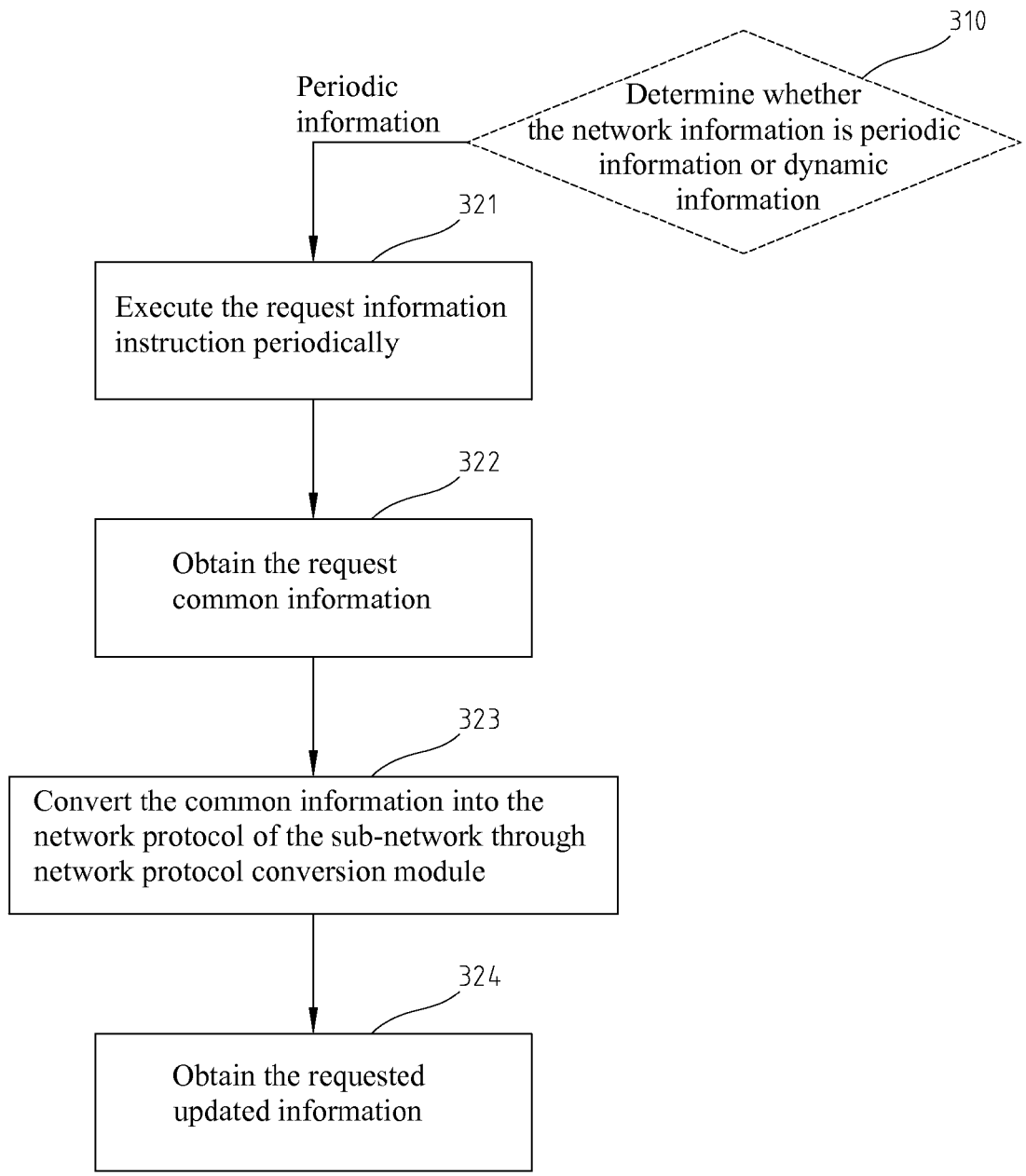
FIG. 3B shows an exemplary flowchart illustrating a processing on periodic information through the LAN management module of FIG. 3A, consistent with certain embodiments of the present invention.

FIG. 3B shows an exemplary flowchart illustrating a processing on periodic information through the LAN management module of FIG. 3A, consistent with certain embodiments of the present invention. Referring to FIG. 3B, if the network information in step 310 is periodic information, LAN control module 103A may execute the request information instruction periodically, as shown in step 321. Requested common information through network information module 103B may be obtained as shown in step 322. Network protocol conversion module 103C may convert the common information into the network protocol of the sub-network, as shown in Step 323. Therefore, the requested updated information from sub-network agent 1011-101N may be obtained, as shown in step 324.

Figure 3C:
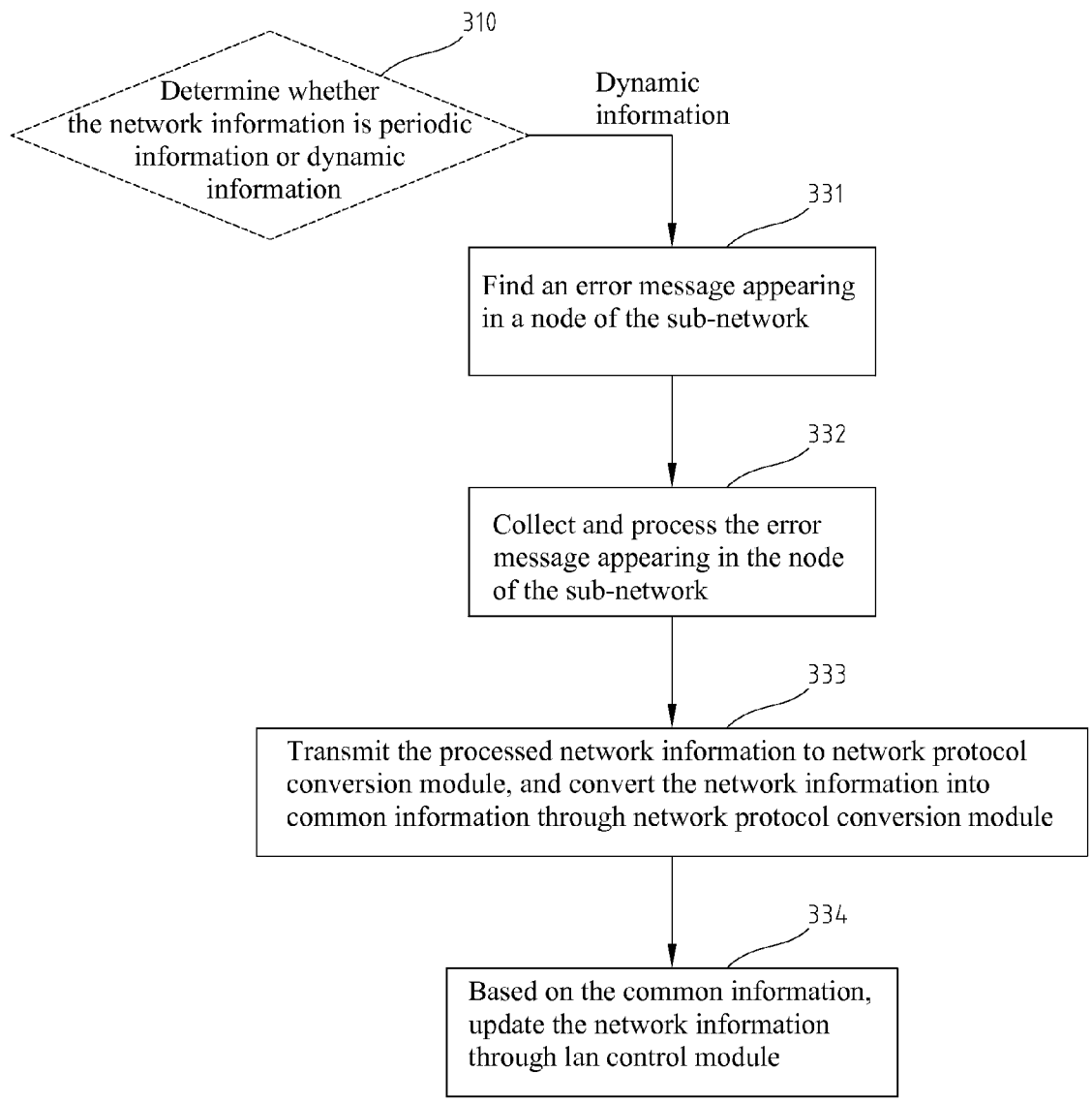
FIG. 3C shows an exemplary flowchart illustrating a processing on dynamic information of FIG. 3A through the LAN management module of FIG. 3A, consistent with certain embodiments of the present invention.

FIG. 3C shows an exemplary flowchart illustrating a processing on dynamic information of FIG. 3A through the LAN management module of FIG. 3A, consistent with certain embodiments of the present invention. Referring to FIG. 3C, if the network information in step 310 is dynamic information, an error message appearing in a node of the sub-network may be found, as shown in step 331. The error message appearing in the node of the sub-network may be collected and processed by sub-network agent 1011-101N, as shown in step 332. Sub-network agent 1011-101N may send the network information to network protocol conversion module 1 03C, and network protocol conversion module 103C may convert the network information into common information, as shown in step 333. Based on the common information, LAN control module 103A may update the network information, as shown in step 334.

Figure 4A:
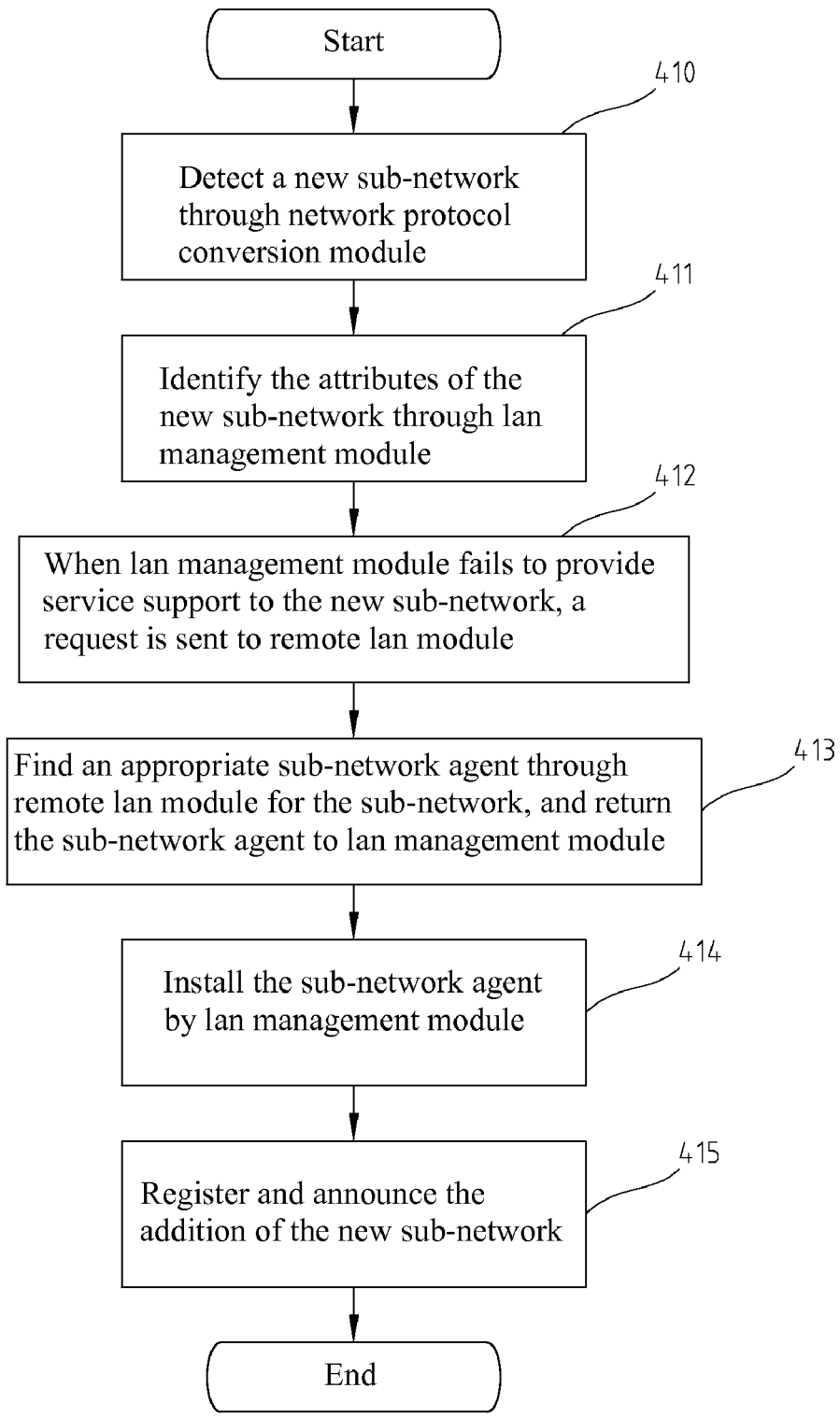
FIG. 4A shows an exemplary process of adding a new sub-network, consistent with certain embodiments of the present invention.

In addition to the network information update and network diagnosis described in the above exemplary embodiment of managing architecture of the present disclosure, the exemplary managing architecture may also add a new sub-network to the network architecture. FIG. 4A shows an exemplary process of adding a new sub-network, consistent with certain embodiments of the present invention.

Referring to FIG. 4A, network protocol conversion module 103C may detect a new sub-network, as shown in step 410. LAN management module 103 may identify the attributes of the new sub-network, as shown in step 411, for example, to identify whether the new sub-network is a known network or have a sub-network agent, and the existence of the service supporting the new sub-network.

When LAN management module 103 fails to provide service support to the new sub-network, a request is sent to remote LAN module 105, as shown in step 412. In step 413, remote LAN module 105 may find an appropriate sub-network agent for the sub-network, and returns the sub-network agent to LAN management module 103. In step 414, LAN management module 103 may install the sub-network agent. In step 415, LAN management module 103 may register and announce the addition of the new sub-network.

The following describes the process from LAN management module 103 issuing remote request to new sub-network registration and announcement. For example, LAN control module 103A of LAN management module 103 sends a request to remote LAN control module 105A through channel 104. According to the request, remote LAN control module 105A may analyze and make a decision, and remote information module 105B may find an appropriate sub-network agent from remote common information storage media 105C and return the sub-network agent to LAN control module 103A. LAN control module 103A may download the sub-network agent and install to network protocol conversion module 103C. Network protocol conversion module 103C may execute the new sub-network registration and announcement.

Figure 4B:
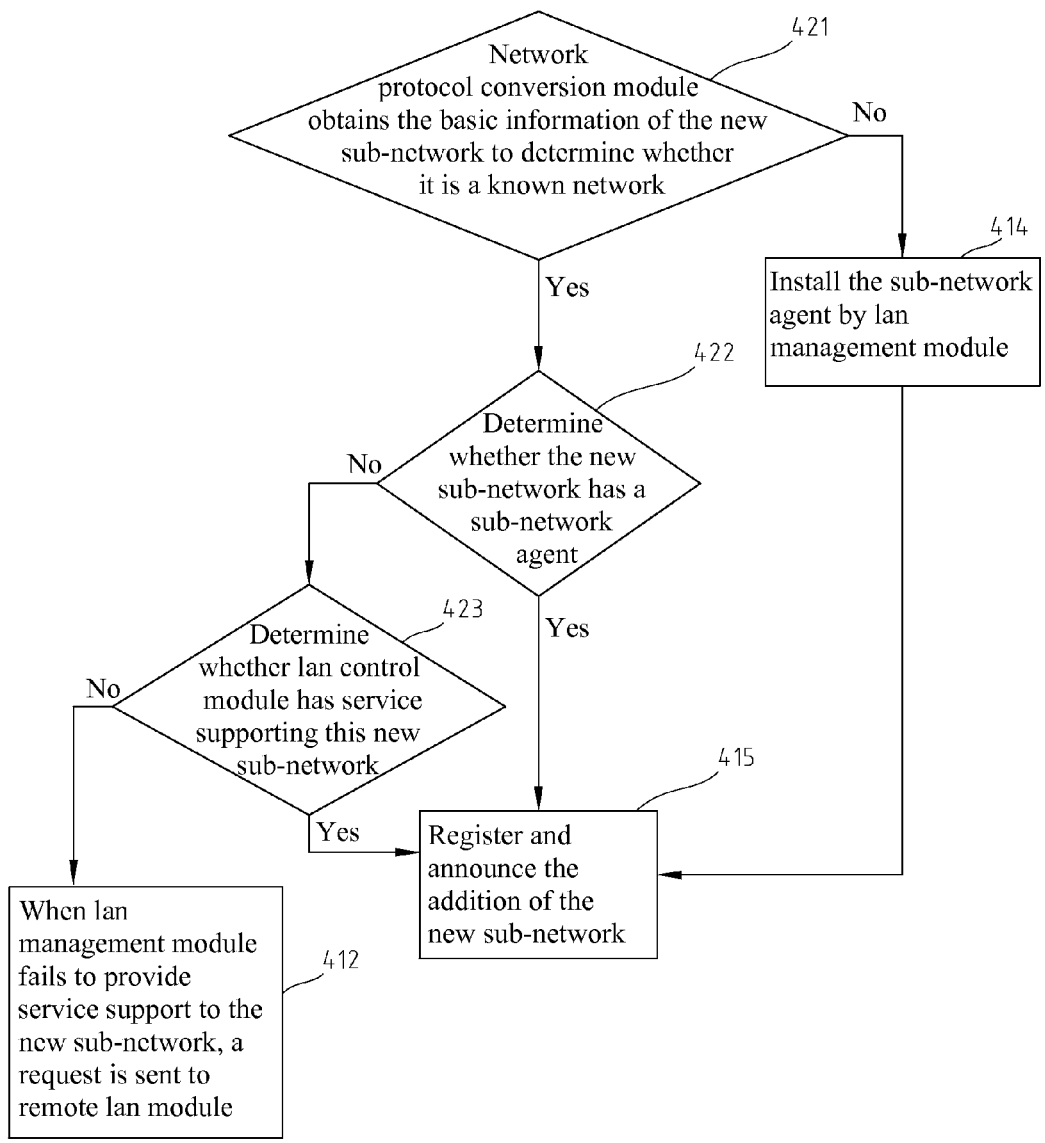
FIG. 4B shows an exemplary process of identifying the attributes of the new sub-network, consistent with certain embodiments of the present invention.

FIG. 4B shows an exemplary process of identifying the attributes of the new sub-network, consistent with certain embodiments of the present invention. Referring to FIG. 4B, network protocol conversion module 103C may obtain the basic information of the new sub-network to determine whether it is a known network, as shown in step 421. If so, whether the new sub-network has a sub-network agent may be determined, as shown in step 422. If the new sub-network does not have a sub-network agent, step 423 is to determine whether LAN control module 103A has service supporting this new sub-network. If the new sub-network is not a known network, proceed to step 412. If the new sub-network has already had a sub-network agent, step 415 is to register and announce the new sub-network.

With the above process, the sub-network agent may perform communication, management and configuration in the new sub-network. The new management service of the new sub-network must be registered to network protocol conversion module 103C, and detailed network information must be provided. Network protocol conversion module 103C may inquire network information module 103B for information through internal communication. Because there is no information service of the new sub-network in common information storage media 103D in the local network, the provided new sub-network information may be stored, and the required service and management module for the new sub-network may be requested from remote LAN module. After analysis and comparison of the information returned by the sub-network agent, the related information may be found and returned to LAN control module 103A. The returned new sub-network information may be configured by LAN control module 103A, and be stored by network information module 103B to common information storage media 103D for future reference. The information on new management service and configuration may be downloaded by the network protocol conversion module to the sub-network agent. After the sub-network agent obtains the new management service, the management and diagnosis function may be provided by the services.

Remote LAN control module 105A, remote network information module 105B, LAN control module 103A, network information module 103B, network protocol conversion module 103C, and sub-network agent 1011-101N all support dynamic update. The functions may also include the version update for object types stored in remote network information module 105B or network information module 103B, and expansion of new modules. Therefore, the functions are able to accommodate the management function improvement or new sub-network agent due to LAN expansion. Hence, remote LAN module 105 and LAN management module 103 may dynamically manage the life span of application programs and provide a simple and expandable platform. For example, placing the Open Service gateway Initiative (OSGi) architecture on top of Java VM will make an ideal platform.

Figure 5:
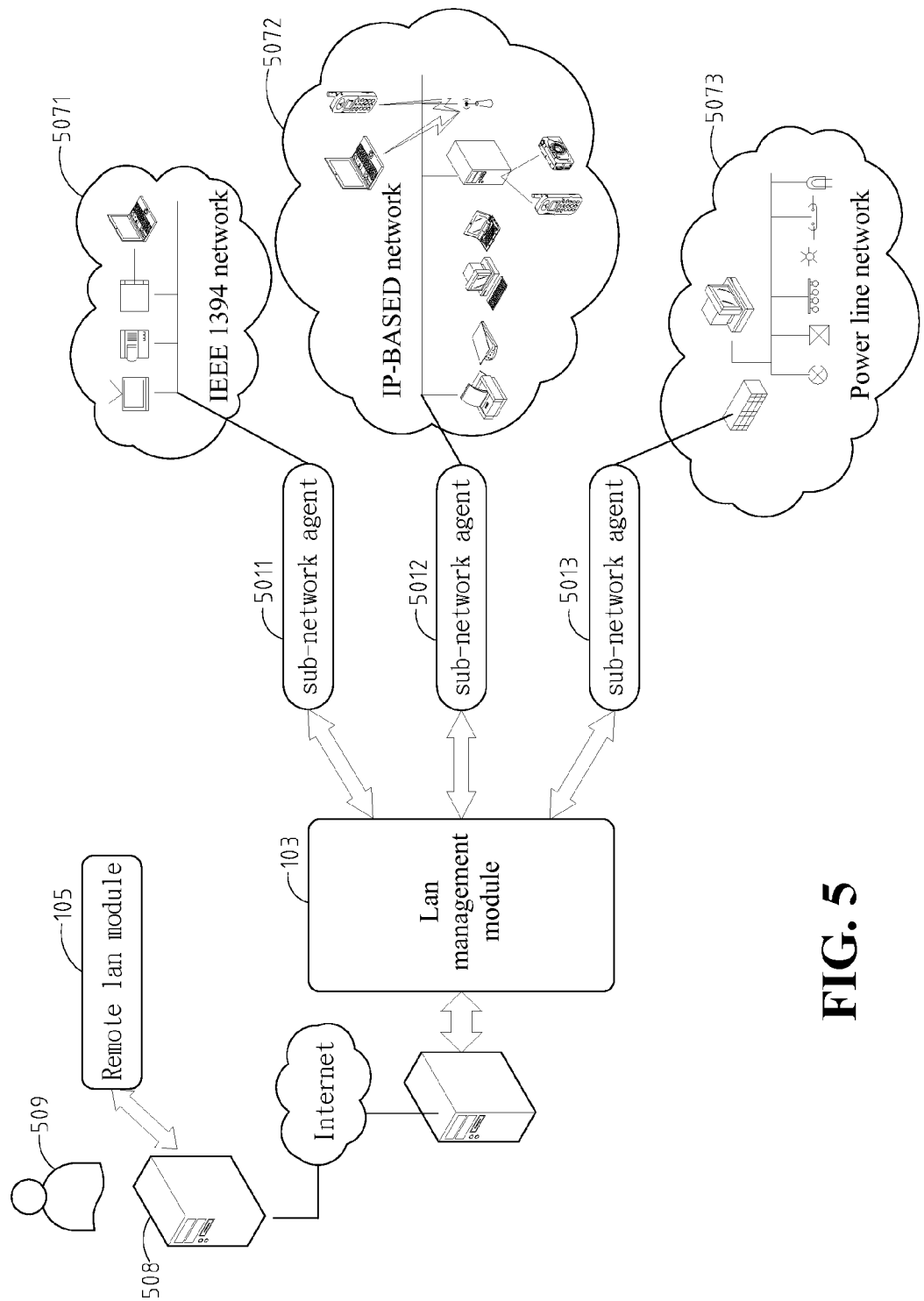
FIG. 5 shows a schematic view of an exemplary managing architecture for home or small business heterogeneous networks, consistent with certain embodiments of the present invention.

FIG. 5 shows a schematic view of an exemplary managing architecture for home or small business heterogeneous networks, consistent with certain embodiments of the present invention. Referring to FIG. 5, the enterprise management architecture foundation, such as WBEM server, may be established on home gateway, such as OSGi-based, and a CIM may be used to integrate the management information of heterogeneous network.

In an open architecture, the platform provided by OSGi has hardware and software that may communicate with each other or be used cooperatively. OSGi defines an open platform to allow remote software provider to provide applications or value-added services for the user to download to neighboring gateway system and install automatically.

WBEM specification describes data model language, naming convention, and technologies for data collection from information providers and other management models and data conversion. The CIM schema provides the actual model description and information structure. WBEM architecture uses HTTP to define all kinds of network management operations, and uses XML encoding to transmit all the operations and results of the operations through network so that WBEM management architecture infrastructure may cross the internet boundary easily.

Referring to FIG. 5, sub-network agents 5011-5013, LAN management module 103, and remote LAN module 105 may realize the management and diagnosis of heterogeneous local networks 5071-5073. Sub-network agents 5011-5013 use their own managing protocol to manage their sub-network. For example, sub-network agent 5012 may, through IP-based network 5072, use SNMP or common management information protocol (CMIP) to obtain the management protocol of IP-based network 7052, may also use management information base (MIB) to know the device information of the IP-based network, or stores the management objects found by the sub-network agent, such as router or switcher information. Sub-network agent 5011 may, through IEEE 1394 network 5071, use IEEE 1394 LAN defined protocol, such as cable configuration, to obtain the newest topology information.

Sub-network agents 5011-5013 may transmit the collected basic network information and management information of the heterogeneous local networks, such as IEEE 1394 network 5071, IP-based network 5072, and power line network 5073, to LAN management module 103, which will converts the information into a unified WBEM standard. The obtained information may be further converted into CIM format, and stored as an MOF file in the common information storage media. Hence, the heterogeneous local networks 5071-5073 may be converted into a unified data model to provide a unified network management information and operation to the remote site. The network information module may access data stored in common information storage media through CIMOM for diagnosis and management.

LAN management module 103 and remote management 509 may communicate with each other through the client-server architecture of WBEM or in a distributed manner, with HTTP and XML through internet transmission to provide remote connection. CIM-SOAP and CIM-XML are also used to allow LAN management module 103 to receive the LAN management diagnosis instruction, and returns the results of LAN management diagnosis instruction execution to remote management center 508.

The functions of remote LAN module 105, LAN management module 103 and sub-network agents 5011-5013 may comply the OSGi bundle format; therefore, these functions are expandable for dynamic addition, update, installation and execution. Hence, it may accommodate different demands and dynamic expansion for solving complicated and various problems in LAN environment.

The information, in addition to transmitting other remote LAN module, may also be stored in common information storage media and display on the user interface. With the remote user interface, remote management 509 may see the network information of the LAN, and use the user interface to control the network. For example, when the user participation is needed in solving the problem, the user interface may be used for audio or visual communication to instruct the user to process related problem. For example, when the hardware is damaged and requires manufacturer repair, the management diagnosis system will inform the user of the detailed manufacturer repair procedure and time to allow the user to decide whether manufacturer repair is desirable. For example, when the user decides to send for manufacturer repair, the system may also automatically contact the manufacturer for pick up and delivery.

As aforementioned, OSGi defines an open architecture to allow remote software provider to provide applications or value-added services for the user to download to neighboring gateway system and install automatically. The gateway may be a device connecting to home network, office network, and WAN, such as set-top box (STB), ASDL modem, cable modem, residential gateway, and so on. With the open architecture, service software and devices from different manufacturers may communicate and work together.

WBEM is proposed by the software and hardware providers, such as Microsoft, Intel, Compaq, and BMC. WBEM may unify the information obtainment in different environment, and is also a combination of management technology and internet standard. WBEM may integrate widely management protocols, such as SNMP. The information management architecture of WBEM is a common information model (CIM) defined by the distributed management task force (DMTF). The CIM is a model for describing the entire management information of all the computer systems and network devices in an enterprise network environment. CIM includes a set of specifications and a set of schemas. The design defines CIM detailed description, including all the managed objects and their description manners. The specifications define the integration of CIM and other management models. CIM is an object model; therefore, the model may be used by different manufacturers to produce compatible products.

Therefore, the exemplary embodiments disclosed by the present invention may be realized by the managing infrastructure for remote configuration of heterogeneous local network constructed by OSGi and WBEM, including establishing WBEM server on an OSGi-based home gateway, and using CIM to integrate and unifying the management information of heterogeneous local networks. The home network management system at the remote home network monitor center may use WBEM server to extract or configure the network information according to the demands so as to achieve the remote management and diagnosis of home network and small business network.

In other words, the exemplary embodiments of the present invention divide the management of remote LAN into two segments. The WAN part uses WBEM architecture, and the LAN part uses the existing managing architecture of heterogeneous local network. The integration and unification of both may be accomplished through the OSGi platform and CIM storage model and data processing of WBEM.

When home or small business heterogeneous network encounters a problem, a request for solution may be sent to LAN management module. If the LAN management module fails to provide a solution, the LAN management module may send a request to a remote LAN module or a remote management for assistance so as to achieve the effective management and diagnosis.

The exemplary embodiments disclosed by the present disclosure may be the infrastructure for managing the home or small business networks. The infrastructure enables the management service providers for heterogeneous local networks for home or small business to provide services while maintaining flexibility and expandability.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A managing architecture having computing processors and memory devices for remote configuration of heterogeneous local networks, comprising:
   one or more sub-network agents each being implemented with a computing processor, memory and program codes executed in said computing processor, each of said one or more sub-network agents using its own managing protocol to manage its connected sub-networks, and collecting information of said connected sub-networks to said memory;
   a local area network (LAN) management module implemented with a computing processor, memory and program codes configured to perform LAN management, coupled respectively to said one or more sub-network agents and a channel, receiving one or more requests from one or more said heterogeneous local networks through said one or more sub-network agents, and translating information accompanying said one or more requests into a common information model for finding a solution to a problem of said one or more requests; and
   a remote LAN module, through said channel for receiving requests for unsolved problems from said LAN management module, remotely accessing and configuring one or more said heterogeneous local networks and using an interface compatible to said one or more heterogeneous local networks to realize management and diagnosis for said one or more heterogeneous local networks;
   wherein said LAN management module further includes a network protocol conversion module that provides service registration and announcement functions.

2. The management architecture as claimed in claim 1, wherein said LAN management module further includes a LAN control module, a network information module, a common information storage media, a user interface and a security module.

3. The management architecture as claimed in claim 2, wherein said remote LAN module further includes a remote LAN control module, a remote network information module, a remote common information storage media, a remote user interface, and a remote security module.

4. The managing architecture as claimed in claim 1, wherein said one or more heterogeneous local networks are chosen from any one combination of home networks and business networks.

5. The managing architecture as claimed in claim 1, wherein the information of said one or more sub-networks is basic information, management information, or any combination of the above.

6. The managing architecture as claimed in claim 1, wherein each of said one or more sub-network agents provides automatic warning and returns information of related events.

7. The managing architecture as claimed in claim 1, wherein said information of said one or more sub-networks is the information on each node of said one or more sub-network, information between said nodes, and other related network information, or any combination of the above.

8. The managing architecture as claimed in claim 1, wherein said managing protocol of each of said one or more sub-network agents is one of Simple Network Management Protocol or Common Management Information Protocol.

9. The managing architecture as claimed in claim 2, wherein said LAN control module provides basic network management functions, network diagnosis process, algorithms for solving network problems and network information update process, and communicates with said remote LAN module.

10. The managing architecture as claimed in claim 1, wherein said network protocol conversion module is responsible for communicating with said one or more sub-network agents and obtaining said basic information or management information of said connected sub-networks.

11. The managing architecture as claimed in claim 1, wherein said information accompanying said one or more requests is converted by said network protocol conversion module into common information.

12. The managing architecture as claimed in claim 11, wherein said network information module analyzes and organizes said common information, and then selects and defines said common information model suitable for storing network information.

13. The managing architecture as claimed in claim 3, wherein security module and said remote security module both have security authentication mechanism, data encryption mechanism, protecting internal information access mechanism, and billing mechanism.

14. The managing architecture as claimed in claim 3, wherein said user interface and said remote user interface provide network information display to inform a user of network information or for the user to issue management instructions.

15. The managing architecture as claimed in claim 14, wherein said network information at least includes network topology conditions, network traffic, network speed, node information, and information on software installed on each node, or any combination of the above.

16. The managing architecture as claimed in claim 3, wherein said remote LAN control module, said remote network information module, said LAN control module, said network information module, said network protocol conversion module and each of said one or more sub-network agents all provide functions supporting dynamic update.

17. The managing architecture as claimed in claim 16, wherein said functions supporting dynamic update include at least adding a new sub-network agent, network information update, and a plurality of object types of said remote network information module and said network information module to update a version or expand a new module according to demands.

18. The managing architecture as claimed in claim 17, wherein said functions supporting dynamic update match a format of an open service gateway initiative bundle.

19. The managing architecture as claimed in claim 3, wherein said remote LAN control module inherits functions of said LAN control module, has information of said LAN control module, and utilizes global data.

20. The managing architecture as claimed in claim 19, wherein said global data includes detailed information requested from said LAN control module, said detailed information is stored temporarily in said remote common information storage media to assist in solving an unsolved problem of said LAN control module.

21. The managing architecture as claimed in claim 19, wherein said information of said LAN control module includes identification data of one or more LANs, and individual information of a service class owned by a corresponding LAN.

22. A diagnosis method for remote configuration of heterogeneous local networks, comprising the steps of:
   detecting whether any sub-network connected to one or more sub-network agents encounters any problem through said one or more sub-network agents;
   collecting management information and network information of the sub-network associated with a problem when at least a sub-network connected to said one or more sub-network agents encounters the problem, and transmitting said management information and said network information to a local area network (LAN) management module;
   converting said management information and said network information of the sub-network associated with the problem into a common information model and performing diagnosis to determine whether a solution is provided through said LAN management module;
   requesting a remote LAN module or a remote management for assistance to realize management and diagnosis of said sub-network associated with the problem when said LAN management module is unable to provide a solution; and
   returning a diagnosis message to a user interface or a sub-network agent of the sub-network associated with the problem;
   wherein when at least a sub-network connected to said one or more sub-network agents encounters the problem, said LAN management module performs the following steps of:
      obtaining and converting said management information and said network information of the sub-network associated with the problem into common information;
      analyzing and organizing said common information, and then selecting and defining a common information model suitable for storing said network information; and
      analyzing and diagnosing cause of the problem based on said common information, and determining whether a solution is provided.

23. The diagnosis method as claimed in claim 22, wherein said management information and said network information are obtained from periodic information or dynamic information.

24. The diagnosis method as claimed in claim 23, wherein said periodic information is obtained by an extract instruction issued by said LAN management module, and is stored in a common information storage media.

25. The diagnosis method as claimed in claim 23, wherein said dynamic information is information returned by at least a network device when an event set in accordance with diagnosis and management demands occurs.

26. A diagnosis method for remote configuration of heterogeneous local networks, comprising the steps of:
   detecting whether any sub-network connected to one or more sub-network agents encounters any problem through said one or more sub-network agents;
   collecting management information and network information of the sub-network associated with a problem when at least a sub-network connected to said one or more sub-network agents encounters the problem, and transmitting said management information and said network information to a local area network (LAN) management module;
   converting said management information and said network information of the sub-network associated with the problem into a common information model and performing diagnosis to determine whether a solution is provided through said LAN management module;
   requesting a remote LAN module or a remote management for assistance to realize management and diagnosis of said sub-network associated with the problem when said LAN management module is unable to provide a solution; and
   returning a diagnosis message to a user interface or a sub-network agent of the sub-network associated with the problem;
   wherein when said LAN management module fails to provide a solution, said remote LAN module performs the following steps of:
      receiving the problem and data from said LAN management module through a channel;
      performing diagnosis and determining whether a solution can be provided;
      using a user interface to allow said remote management to diagnose the problem when a solution can not be provided; and
      transmitting a diagnosis message through said channel to said LAN management module.

* * * * *